3,048,562
PROCESS FOR OXIDIZING POLYMERIC BUTADIENE DRYING OIL IN THE PRESENCE OF STEAM-CRACKED PETROLEUM RESIN, AND RESULTING PRODUCT
Neville Leverne Cull, Baker, and Edward Allen Hunter, Terrace George Verbois, and Richard Louia Ray, Baton Rouge, La., assignors to Esso Research and Engineering Company, a corporation of Delaware
No Drawing. Filed Sept. 14, 1959, Ser. No. 839,598
4 Claims. (Cl. 260—45.5)

This invention relates to oxidized mixtures of liquid polymers of conjugated diolefins and petroleum cracked distillate resins and to methods for making the same.

It is known to oxidize liquid polymers of conjugated diolefins, such as butadiene, or copolymers of such diolefins with vinyl aromatic hydrocarbons, such as styrene, by blowing the polymer or copolymer with air or oxygen in the presence of a cobalt, lead, iron, or manganese catalyst at a temperature between 20° and 150° C. for about 1 to 2 hours in the presence of a hydrocarbon diluent, preferably an aromatic hydrocarbon or fraction having a kauributanol value of at least 40. Paraffinic hydrocarbon solvents can be used under special conditions, but the oxidation is difficult to control because of the increased insolubility of the oxidized polymer in such solvents. For that reason, it has been considered most practical to use a solvent having a high aromatic content in order to keep the oxidized polymer in solution. While the use of such high aromatic hydrocarbon solvents afford an excellent method for oxidizing relatively dilute solutions of polymer, even the presence of very highly aromatic hydrocarbon solvents having kauri-butanol values in the neighborhood of 100, such as Solvessos 100 and 150 will not prevent the gelation of polymer solutions having a non-volatile content much greater than 50%. The oxidation of more concentrated polymer solutions is desirable because the amount of solvent needed is reduced and the resulting stripping costs are lowered.

In accordance with the present invention it has been found that polymer concentrations in excess of 50% can be oxidized without resultant gelation provided that a portion of the polymer oil is replaced with petroleum steam-cracked distillate resins. From 10 to 50% of the liquid diolefin polymer can be replaced with the petroleum resin in this manner. In general, the greater the amount of petroleum resin present, the lower the viscosity of the product compared to the same concentration of 100% polymer in the solution.

The synthetic oils to which the present invention is applicable are polymers of butadiene, isoprene, dimethyl butadiene, piperylene, methylpentadiene, or other conjugated diolefins having 4 to 6 carbon atoms per molecule. Instead of polymerizing any of the aforesaid diolefins alone, they may be copolymerized in admixtures with each other or in admixtures with minor amounts of ethylenically unsaturated monomers copolymerizable therewith, e.g., with 0 to 40% of styrene, styrenes having alkyl groups substituted on the ring such as para methyl styrene, dimethyl styrene or diethyl styrene, acrylonitrile, methacrylonitrile, methyl acrylate, methyl methacrylate, vinyl isobutyl ether, methyl vinyl ketone, and isopropenyl methyl ketone. Such synthetic oils may be advantageously prepared by mass polymerization either in the presence of a hydrocarbon soluble peroxide catalyst, such as benzoyl peroxide or cumene hydroperoxide, or in the presence of metallic sodium when the monomers consists of a diolefin or of a mixture of a diolefin with a styrene compound. Under proper conditions, the emulsion polymerization technique may also be adapted to the preparation of drying oils to which the present invention is applicable. Suitable polymerization methods are illustrated below. Throughout the present description it will be understood that all properties are expressed on a weight basis unless otherwise specified.

SYNTHESIS METHOD A

For example, 100 parts of butadiene-1,3, 50 parts of straight run mineral spirits boiling between 150° and 200° C. (Varsol), 3 parts t-butyl hydroperoxide (60% pure) and 0.75 part of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content with mineral spirits. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. Patent No. 2,586,594 of Arundale et al. which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3 20 parts of styrene, 200 parts of straight-run mineral spirits boiling between 150° and 200° C., 40 parts of dioxane, 0.2 part of isopropanol, and 1.5 parts of finely dispersed sodium are heated at about 50° C. in a closed reactor provided with an agitator. Complete conversion is obtained in about 4.5 hours, whereupon the catalyst is destroyed by adding an excess of isopropanol to the polymerized charge. The crude product is cooled, neutralized with carbon dioxide or glacial acetic acid or other anhydrous organic acid and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50–100% non-volatile matter is obtained.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about $-15°$ C. and 250° C., preferably between 60° and 200° C., e.g., butane, benzene, xylene, naphtha, cyclohexane, and the like. The diluents are usually used in amounts ranging from 50 to 500 parts per 100 parts of monomer. The reaction temperature may vary between about 40° C. and 100° C., preferably around 65° to 85° C. As a catalyst, 0.1 to 10 parts of dispersed metallic sodium is used per 100 parts of monomers, sodium particle sizes below 100 microns being particularly effective.

A particularly suitable process for the preparation of the polymer oil in accordance with this synthesis is the multi-stage continuous process described and claimed in Serial No. 485,392, filed February 2, 1955, in the name of Stanley E. Jaros et al. The disclosures of this application are incorporated herein by reference.

The polymers produced by the above process have molecular weights up to 10,000 and viscosities up to 22 poises at 50% N.V.M. and are pale yellow to colorless liquids.

Petroleum steam-cracked distillate resins suitable for blending with the above liquid polymers prior to oxidation in accordance with this invention are made from petroleum steam-cracked distillates boiling in the range of about 18° to 230° C., or any fraction boiling within this range such as the $C_5-C_7$ fraction boiling 18° to 85° C., or the isoprene-free $C_5$ fraction boiling 38° to 46° C. Typical $C_5$ fractions of this character have the following analysis:

|  | Weight Percent |
|---|---|
| Isoprene | 0.5 to 3.0 |
| Transpentene-2 | 3.0 to 5.0 |
| Cispentene-2 | 2.0 to 12.0 |
| 2-methylbutene-2 | 2.0 to 20.0 |
| Cyclopentadiene | 0.0 to 5.0 |
| Transpiperylene | 20.0 to 55.0 |
| Cispiperylene | 15.0 to 55.0 |
| Cyclopentene | 7.0 to 20.0 |
| Cyclopentane | 0.0 to 4.0 |
| Acetylenes | Traces |
| $C_6+$ | 0.0 to 2.0 |

Such fractions are obtained by cracking heavy naphtha kerosene, gas oil, and the like at relatively low pressures and at temperatues of 1000° to 1600° F. in the presence of steam and for relatively short contact times. The cracked product is distilled to remove all materials boiling above 85° C. thus eliminating all diolefins heavier than $C_6$ and the least active $C_7$ olefins. It is even more desirable to remove all of the $C_6$ hydrocarbons and to extract the isoprene fraction boiling 18° to 38° C. The remaining fraction boiling 38° to 46° C. may be used as thus obtained, or it can be further treated by heating for 6–16 hours to dimerize all of the cyclic diolefins which are separated by distillation. These streams may be fortified by the addition of diolefin monomers, dimers, co-dimers, or heavy tetramers, such as $C_4$, $C_5$, and $C_6$ cyclic or acyclic diolefins; e.g., the 38°–46° C. fraction can be combined with 36 to 40% of dicyclopentadiene.

Any of the above streams are polymerized by means of a Friedel-Crafts catalyst, such as $AlCl_3$, $AlBr_3$, $BF_3$, $ZrCl_4$, Friedel-Crafts complexes, and the like at temperatures in the range of $-18°$ to $+66°$ C. About 0.5 to 2% catalyst based on the feed charged is usually quite satisfactory. The reaction is carried out in the liquid phase. The catalyst may be added continuously or batchwise. The time required for the polymerization depends primarily on the rate at which the catalyst can be added. The products are worked up by water or caustic washing or by washing with dilute sulfuric acid (5%) followed by water washing. The polymerized resin is then stripped free of unreacted feed components and any of the low molecular weight polymerization products to give the final resin. The exact yield and softening point of the final product will depend upon the degree of stripping.

The above described liquid polymers of diolefins or copolymers of diolefins with vinyl aromatic hydrocarbons are mixed with the petroleum steam-cracked distillate resins in the proportion of 50 to 90 parts by wt. of the liquid polymer and 10 to 50 parts of the petroleum resin and then blown with air or oxygen at a temperature of 20°–150° C., preferably 90° to 120° C., in the presence of an aromatic hydrocarbon solvent having a kauributanol value of at least 40, such as benzene, toluene, ortho, meta and para xylene, or mixtures thereof, or petroleum fractions having a high kauri-butanol value, such as Solvesso 100 (boiling 157°–177° C. and having a kauri-butanol value of 98–100) and Solvesso 150 (boiling 185°–215° C. and having a kauri-butanol value of 98–100). The blowing is best carried out in the presence of catalysts including the organic salts of metals, such as the naphthenates, octoates, and other hydrocarbon soluble metal salts of cobalt, lead, iron, and manganese. These catalysts are used in amounts ranging from 0.001 to 1.0%. Peroxides, such as benzoyl peroxide and the like, may be added to reduce the induction period.

In the practice of one embodiment of the invention a mixture of (A) 50–90 parts by wt. of a liquid polymer of a conjugated diolefin or a copolymer thereof with a vinyl aromatic hydrocarbon having a molecular weight of 5000 to 10,000 and a viscosity of 50% N.V.M. of between 0.3 poise and 22 poises, and (B) 10–50 parts of a petroleum resin prepared from a selected steam-cracked distillate stream and having a softening point of 85° to 100° C. or higher is diluted to the desired degree with a highly aromatic hydrocarbon solvent and oxidized by blowing air or oxygen into a tube or vertical tank containing the diluted mixture. The air or oxygen is introduced through a porous thimble or distributing plate near the bottom of the tank so as to afford maximum introduction of oxygen into the polymer-resin mixture. The blowing is continued from 1 hour up to 4 days.

All of the above conditions of temperature and time of reaction, ratio of reactants, degree of dilution, the specific solvent used, and the like will depend upon various factors, including the degree of oxidation desired and the exact nature and proportion of the polymer-resin mixture. Therefore, it is not intended that the invention be limited by the specific conditions and examples herein set forth as it is intended to illustrate and not limit the invention.

The nature of the oxidized product of this invention depends on the proportion of the starting mixtures and the extent to which the oxidation is carried. This last factor in turn depends on time of oxidation, temperature, presence or absence of catalysts, specific solvent, etc. The amount of oxygen in the product will vary from a trace upwards but usually varies from 10 to 20%.

As pointed out above, the presence of 10 to 50% of petroleum resins in the liquid diolefin polymer during oxidation enables the oxidation to be carried out in the presence of smaller amounts of solvent without resultant gelation. The amount of solvent can be reduced to 40% or less by this means. The presence of the petroleum resins in no way hinders or interferes with the oxidation of dilute mixtures and yields an oxidized product having a lower viscosity than the 100% polymer oil.

The resulting oxidized mixture functions as an excellent varnish or enamel base. The concentration of pigment may be varied within broad ranges, such as between 5 and 75%, based on the weight of the non-volatile polymer and resin constituents present. While the oxygen-treated polymer-resin mixtures of the invention yields protective coatings having well-balanced properties, they can be modified further by mixing therewith other drying oils, such as linseed oil, tung oil, soybean oil, or other unsaturated vegetable oils. They may also be blended with other common additives to modify the properties of the films. For example, melamine-formaldehyde resins, tetrachlorophthalic anhydride, phosphoric acind, alkyl phosphates, and the like.

It is not necessary to mix the resin and the polymer prior to oxidizing in order to obtain a suitable coating composition. All of the desirable properties of the oxidized mixture described above are equally obtainable if the resin and the polymer are oxidized separately and then blended in the desired proportions. Generally, the same proportions found useful when oxidizing the mixture are also suitable when mixing the separately oxidized components, namely 10 to 50 parts by wt. of resin and 50 to 90 parts of polymer or copolymer oil.

The invention can be more fully understood by applying the following illustrative examples to the discussion and disclosure herein set forth.

*Example I*

A solution in Solvesso 100 of a butadiene-styrene copolymer oil made in accordance with synthesis B having a concentration of 60% and a solution of a mixture of 45 wt. percent of this same oil with 15% of a petroleum resin of the type described above and having a nonvolatile concentration of 59% were each blown with air at a temperature of about 50°–60° C. in the presence of about 1% manganese naphthenate. The following data were obtained:

| Run | Weight percent | | Conc. | Product visc. in poise at 50% N.V.M. |
|---|---|---|---|---|
| | Resin | Copolymer | | |
| 1 | 0 | 60 | 60 | ¹ Gelled |
| 2 | 15 | 45 | 59 | 1.8 |

¹ Product gelled after blowing for 2 hrs. with approximately 5–6 weight percent oxygen absorbed.

*Example II*

Two runs were made similarly to Example I except that different proportions of resin and copolymer were used. The following data were obtained:

| Run | Weight percent | | Conc. | Product visc. in poise at 50% N.V.M. |
|---|---|---|---|---|
| | Resin | Copolymer | | |
| 3 | 17.5 | 17.5 | 35 | 1.04 |
| 4 | 7 | 28 | 35 | 1.75 |

The above data in Example I show that the liquid copolymer of butadiene and styrene cannot be oxidized to any great degree at concentrations of 60 wt. percent unless a small amount of petroleum resins are present, while the data of Examples I and II show that the viscosity of the blend is lower the higher the concentration of resin present. A comparison of Runs 2 and 4 shows that the viscosity of a 60% solution containing 25% resin is about the same as that of a 35% solution containing 20% resin.

*Example III*

Polybutadiene prepared in accordance with synthesis B was oxidized with air to oxygen contents of 10 and 17% and mixed with 25% of oxidized (8–10% oxygen content) petroleum resin prepared by $AlCl_3$ polymerization of a feed stock formed by blending 38% dicyclopentadiene with a cracked distillate fraction having the following analysis:

| | Weight, percent |
|---|---|
| Isoprene | 1.1 |
| Transpentene-2 | 3.6 |
| Cispentene-2 | 7.4 |
| 2-methylbutene-2 | 13.7 |
| Cyclopentadiene | 1.2 |
| Transpiperylene | 34.2 |
| Cispiperylene | 20.9 |
| Cyclopentene | 14.7 |
| Cyclopentane | 1.5 |
| Acetylenes | Traces |
| $C_6+$ | 1.0 |

The resultant blends were laid down as films on steel panels and cured by baking for five hours at 150° C. The following data were obtained:

| Polymer | Oxidized resin | Film thickness (mils) | Flex ¹ | | | Pencil hardness |
|---|---|---|---|---|---|---|
| | | | ⅛ | ¼ | ½ | |
| 75% A | 25 | 1.0 | F | F | P | 7H |
| 75% A | 25 | .8 | F | P | P | 2H |
| 75% B | 25 | .9 | F | F | P | 4H |
| 100% C | 0 | 1.2 | F | F | F | B |
| 100% A | 0 | 1.4 | F | F | P | 4H |
| 100% B | 0 | 1.4 | F | F | P | 6H |

¹ Flex test: Smallest mandrel diameter over which a panel can be bent 180° without film cracking—F=fail; P=pass.

Note.—Polymer A—Oxidized polybutadiene containing 10% oxygen. Polymer B—Oxidized polybutadiene containing 17% oxygen. Polymer C—Polybutadiene containing 0% oxygen.

The above data show that mixtures of oxidized polybutadiene and oxidized resins form films which, when cured, are better than the unoxidized polybutadiene drying oil and are equal to or better than the oxidized polybutadiene oil.

*Example IV*

Various mixtures of a copolymer of butadiene and styrene made in accordance with synthesis B were mixed with the petroleum resin of Example III and oxidized and films of the oxidized mixtures were laid down on steel Q panels and cured for 30 min. at 177° C. The following data were obtained:

| Feed to oxidation | | Film thick. (mils) | Hardness sward ¹ | Tack ² | Chem. res. ³ | | | |
|---|---|---|---|---|---|---|---|---|
| Polymer | Resin | | | | W | S | G | C |
| 0 | 100 | 1.0 | 28 | 2 | 5 | 9 | 6 | 6 |
| 75 | 25 | 1.0 | 42 | 0 | 0 | 0 | 0 | 0 |
| 0 | 100 | 1.0 | 26 | 2 | 7 | 9 | 6 | 6 |
| 0 | 100 | .95 | 30 | 0 | 4 | 9 | 7 | 7 |
| 0 | 100 | .95 | 38 | 1 | 8 | 9 | 6 | 6 |
| 50 | 50 | 1.15 | 42 | 0 | 0 | 0 | 0 | 0 |
| 75 | 25 | 1.2 | 42 | 0 | 0 | 0 | 0 | 0 |
| 80 | 20 | 1.15 | 30 | 0 | 0 | 0 | 0 | 0 |

¹ Based on glass as 100.
² 0, tack free; 1–2, slight tack; 3, dust-free; 4–5, heavy tack; 6, just set to touch—no resin removed; 7–9, streaky to wet.
³ W, water; S, soap; G, grease; C, caustic. Exposures—water 5 hrs.; soap and grease, 2 hrs. 1% caustic; 1 hr. Ratings: 0, unaffected; 1–3, discolored or whitened and loss in adhesion; 4–6, softened and loss in adhesion; 7–9, pinholed or blistered by removal of film.

The above data show that satisfactory films can be obtained from oxidized mixtures of petroleum resins and liquid polymer drying oils. The films of the mixtures are much superior to those of the resin alone with respect to tack, hardness and resistance to chemicals.

The nature and objects of the present invention having been thus fully set forth and specific examples of the same given, what is claimed as new and useful and desired to be secured by Letters Patent is:

1. In a process for oxidizing a polymeric drying oil chosen from the group consisting of homopolybutadiene and a copolymer of butadiene and styrene containing up to 40% styrene by blowing the said oil in an aromatic hydrocarbon solvent with oxygen at a temperature between 20° and 150° C., the improvement which comprises incorporating in said drying oil prior to carrying out the oxidation process 10 to 50%, based on polymeric drying oil, of a resin obtained by polymerizing a steam-cracked petroleum distillate stream boiling 18° to 85° C. with a Friedel-Crafts catalyst at a temperature between −18° and +66° C.

2. The process according to claim 1 in which the polymer is polybutadiene and the resin is obtained by polymerizing a feed stock consisting of 60 to 64% of a steam-cracked petroleum distillate boiling 38°–46° C. and having the following composition:

| | Weight Percent |
|---|---|
| Isoprene | 0.5 to 3.0 |
| Transpentene-2 | 3.0 to 5.0 |
| Cispentene-2 | 2.0 to 12.0 |
| 2-methylbutene-2 | 2.0 to 20.0 |
| Cyclopentadiene | 0.0 to 5.0 |
| Transpiperylene | 20.0 to 55.0 |
| Cispiperylene | 15.0 to 55.0 |
| Cyclopentene | 7.0 to 20.0 |
| Cyclopentane | 0 to 4.0 |
| Acetylenes | Trace |
| $C_6+$ and 36 to 40% dicyclopentadiene | 0 to 2.0 |

3. The process according to claim 1 in which the polymer is a copolymer of 60% by wt. of butadiene and 40% by wt. of styrene and the resin is obtained by polymerizing a feed stock consisting of 60 to 64% of a steam-cracked petroleum distillate boiling 38°–46° C. and having the following composition:

| | Weight Percent |
|---|---|
| Isoprene | 0.5 to 3.0 |
| Transpentene-2 | 3.0 to 5.0 |
| Cispentene-2 | 2.0 to 12.0 |
| 2-methylbutene-2 | 2.0 to 20.0 |
| Cyclopentadiene | 0.0 to 5.0 |
| Transpiperylene | 20.0 to 55.0 |
| Cispiperylene | 15.0 to 55.0 |
| Cyclopentene | 7.0 to 20.0 |
| Cyclopentane | 0 to 4.0 |
| Acetylenes | Trace |
| $C_6+$ and 36 to 40% dicyclopentadiene | 0 to 2.0 |

4. A composition of matter comprising a mixture of 50–90 parts by weight of an oxidized polymer of butadiene and 10–50 parts of an oxidized resin obtained by polymerizing a steam-racked petroleum distillate fraction boiling 18° to 55° C. with a Friedel-Crafts catalyst at a temperature between −18° and +66° C., said polymer and said resin each being oxidizied by blowing with oxygen at a temperature between 20° and 150° C. until each contains 10–20% by wt. of oxygen.

References Cited in the file of this patent

UNITED STATES PATENTS

| 2,131,195 | Schneider et al. | Sept. 27, 1938 |
| 2,705,703 | McKay et al. | Apr. 5, 1955 |
| 2,959,619 | Hutchinson | Nov. 8, 1960 |

FOREIGN PATENTS

| 781,420 | Great Britain | Aug. 21, 1957 |
| 576,624 | Canada | May 26, 1959 |